L. A. CASGRAIN.
NAILING MACHINE.
APPLICATION FILED OCT. 24, 1898.

1,017,381.

Patented Feb. 13, 1912.

UNITED STATES PATENT OFFICE.

LOUIS A. CASGRAIN, OF WINCHESTER, MASSACHUSETTS, ASSIGNOR, BY MESNE ASSIGNMENTS, TO UNITED SHOE MACHINERY COMPANY, A CORPORATION OF NEW JERSEY.

NAILING-MACHINE.

1,017,381.     Specification of Letters Patent.     Patented Feb. 13, 1912.

Application filed October 24, 1898. Serial No. 694,381.

*To all whom it may concern:*

Be it known that I, LOUIS A. CASGRAIN, of Winchester, county of Middlesex, State of Massachusetts, have invented an Improvement in Nailing-Machines, of which the following description, in connection with the accompanying drawings, is a specification, like letters on the drawings representing like parts.

This invention relates to machines particularly adapted for inserting nails or fastenings, cut from suitable wire-like material, into the outer sole to confine it to the upper and inner sole in the manufacture of boots and shoes, or to reinforce or quilt outer soles and also to slug heels.

In the apparatus to be described hereinafter, means are provided for inserting fastenings in pairs if desired, cut or severed from two strips of wire-like material, the cross-section thereof being of any desired shape, and by means of a suitable device the feed of one of the strips of material may be prevented if it is desired, to insert fastenings singly into the work.

As shown and described in Letters Patent, No. 786,190, granted to me March 28, 1905, the wire-like material is herein illustrated as contained in a horizontally supported reel or carrier of such construction that the wire-like material can be drawn from the inside of the coil, and so far as my invention is concerned it is immaterial how the two wires herein employed are mounted in the reel, as the two separate coils may be superposed in the reel, or the two wires may be wound together as a single coil. In this latter case it will be obvious that the fastenings must necessarily be driven in pairs.

In my present invention I have provided a plurality of awls, each awl entering the work to form an opening therein to receive a fastening, and means are provided to cause the awls to enter the work at different times, or one in advance of the other.

In going around the toe or heel of a shoe, it is of course necessary to turn the shoe, and heretofore it has never been found practicable to use two awls in an awl feed machine because the awls would be broken as the shoe was turned in the feeding operation. It has also been impracticable to use two awls in an edge feed machine, because as the shoe was turned in the feeding operation the awl holes would be turned out of alinement with the drivers. Accordingly I have made provision in the machine herein shown for causing one awl to enter the work in advance of the other awl. After the feed has been effected and the work turned as may be necessary the other awl enters the work and makes its hole for the insertion of a fastening. In the present embodiment of my invention I use two awls, of unequal length, the longer awl being caused to enter the work first and effect also the feed of the work, and thereafter the other, shorter awl is caused to enter the work.

The various novel features of my invention will be fully described in the sub-joined specification and particularly pointed out in the following claims.

Fig. 2 is a right hand end elevation of the clutch controller and brake mechanism shown in Fig. 1. Fig. 3 is an inner face view of the controlling cam for the work-support or horn, the coöperating devices, and the brake mechanism, the main driving shaft of the machine being shown in section. Fig. $3^a$ is an enlarged detail of a part of the mechanism shown in Fig. 3, to be referred to. Fig. 4 is a sectional detail on the line $x$—$x$, Fig. 2, of a portion of the brake mechanism. Figs. 5, $5^a$ and $5^b$ are detail views in elevation of some of the parts shown in Fig. 4. Fig. 6 is a sectional detail taken on the line $x'$—$x'$, Fig. 2, showing the fast and loose members of the clutch, and the coöperating brake member. Fig. 13 is an enlarged transverse sectional view, on the line $x^4$—$x^4$, Fig. 1, looking toward the right, of the controlling means for feeding the work, and a portion of the wire feeding mechanism. Fig. 13$^a$ is a detail view of a portion of the means for changing the length of the feed, taken on the line 13—13, Fig. 13. Fig. 14 is a similar view of the wire feeding mechanism, taken on the line $x^5$—$x^5$, Fig. 1. Fig. 16 is an enlarged view in elevation of the wire feed and presser rolls shown in Fig. 14. Fig. 17 is a vertical section thereof taken through the center of the presser rolls on the line $x^6$—$x^6$, Fig. 16. Fig. 18 is a perspective view of the wire guide, detached, through which guide the wires pass on their way to the rolls.

The main frame work comprises a supporting column A having at its upper end a head A′ of suitable shape to provide bearings and supports for the various working parts, the base of the column resting on the floor and supporting suitable operating treadles not shown, for controlling the operation of the machine.

Figures 1, 19, 20:
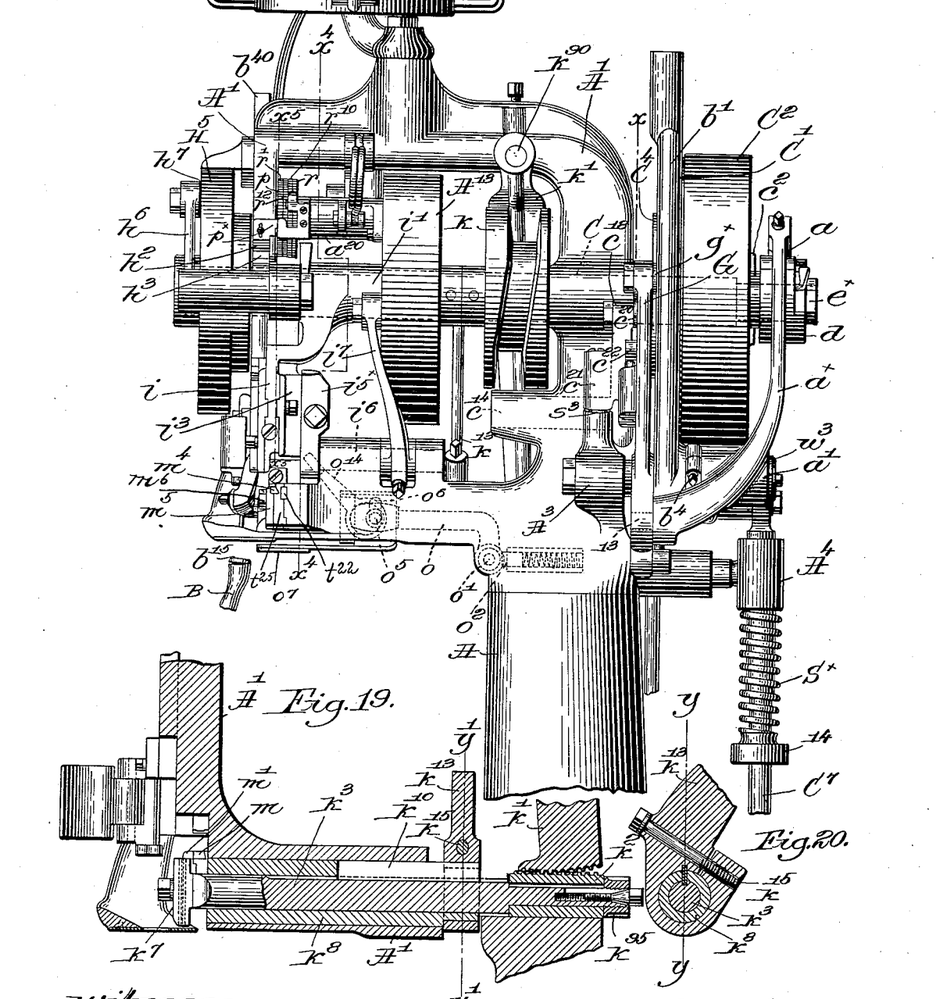
Figure 1 is a right hand side elevation of the upper part or head of a nailing machine embodying my invention, the supporting column and the work-support or horn being broken off to save space, while the usual foot treadles are omitted.
Fig. 19 is an enlarged, partly longitudinal sectional view of the throat or nail carrier and its operative parts, with a portion of the wire severing mechanism, on the line $y$—$y$, Fig. 20.
Fig. 20 is a transverse section on the line $y'$—$y'$, Fig. 19.

The horn operating mechanism may be of any suitable construction, such for instance as shown and described in my beforementioned Letters Patent No. 786,190, granted March 28, 1905, the horn B, Fig. 1, being mounted on the horn shaft or spindle B$^2$ vertically movable in a bearing on the column A, as usual, or substantially as shown in United States Patent No. 403,835, to which reference may be had.

Figures 2, 3, 3A, 4, 5, 5A, 5B, 6, 16, 17, 18:
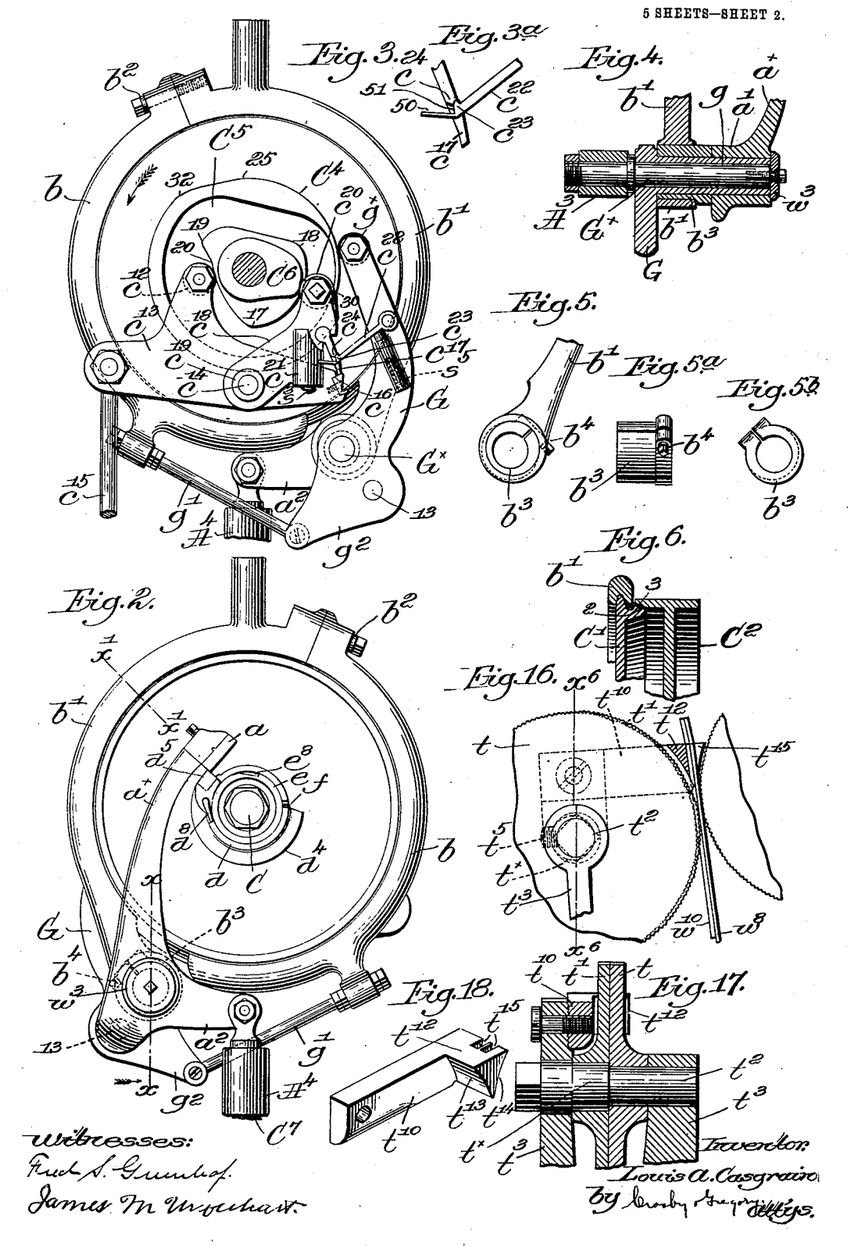

The main shaft C, shown in dotted lines Fig. 1, is supported in bearings in the head A′, and has fast thereon a cam disk C′ having a beveled annular flange 2, see Fig. 6, forming one member of a friction clutch, the coöperating movable member C$^2$ of the clutch being shown as a loose pulley having a beveled friction surface 3, Fig. 6, to coöperate at times with the flange 2.

Figures 7, 8, 9, 10, 11:
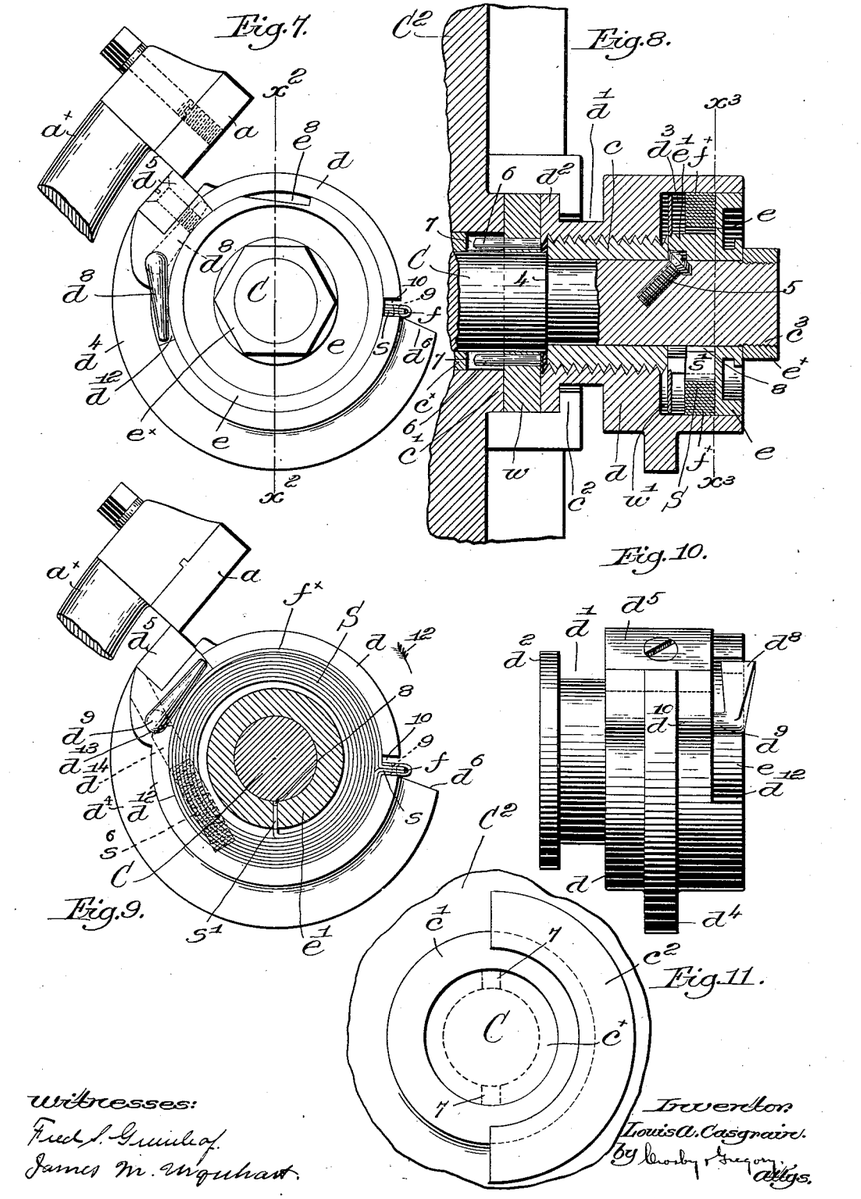
Fig. 7 is an enlarged view in end elevation of the clutch controlling means illustrated in Fig. 2.
Fig. 8 is a diametral sectional view thereof on the line $x^2$—$x^2$, Fig. 7.
Fig. 9 is a transverse sectional view of the clutch controlling means taken on the line $x^3$—$x^3$, Fig. 8, looking toward the left.
Fig. 10 in side elevation represents the major portion of the clutch controlling means.
Fig. 11 in end elevation shows the connection between the movable member of the clutch and the clutch controlling means.

The main shaft C is shouldered near its outer end, as at 4, Fig. 8, and an externally threaded sleeve $c$ is slipped over the reduced portion of the shaft and held against the shoulder by a preferably inclined set screw 5, and the outer, relatively rotative member $d$ of the clutch controller is threaded upon the sleeve $c$, the thread being quite coarse, as shown in Fig. 8. The hub $c^x$ of the fast member C′ of the clutch is laterally extended to form a support for and upon which the movable clutch member C$^2$ rotates and moves longitudinally, the said member C$^2$ having formed upon its hub $c'$ a substantially semi-circular inturned flange $c^2$, to enter an annular groove $d'$ in the inner end of the controlling member $d$, so that movement of the latter longitudinally of the shaft C will effect like movement of the clutch member C$^2$.

A washer $w$ is interposed between the hub $c'$ and the flange $d^2$ at the inner end of the controlling member $d$, pins 6 on the washer extending into sockets 7 in the hub $c^x$, said washer acting to prevent rotation of the said controlling member by or through the clutch member C$^2$, as would be the case if the end of the controlling member contacted with the hub of the clutch member.

The outer end of the member $d$ is shaped to form a socket $d^3$ which receives within it the coöperating member of the clutch controller, shown as a disk $e$ having a hub $e'$ which bears against the adjacent end of the threaded sleeve $c$, a nut $c^x$ on the threaded portion $c^3$ of the shaft C serving to hold said hub $e'$ and sleeve $c$ tightly against the shoulder 4, so that both will be fixed upon and rotate with the shaft.

A strong spring S is coiled around the hub $e'$ and has one end $s'$ inturned to enter a notch 8 in the hub, said spring being inclosed in an annular metal case $f^x$, Fig. 9, the ends of which are out-turned and secured together, as at $f$, the free end $s$ of said spring S being secured to the case by a rivet 9 which also holds the ends of the case together. This radially extended union $f$ projects into a slot 10 in the wall of the member $d$, which it will be remembered is mounted upon the threaded sleeve $c$, so that rotation of the member $d$ thereon will also effect movement of said member in the direction of the length of the shaft. I prefer to mount a thin washer $w'$ on the hub $e'$ at its inner end to thus completely inclose the actuating spring S of the clutch controlling means, the periphery of the disk $e$ fitting snugly in the socket or recess $d^3$ and preventing the entrance of dust or dirt.

By turning the sleeve $c$ slightly on the shaft before the set screw 5 is tightened, the proper engagement of the clutch members is readily effected. so that adjustment for wear or for other purposes is attained.

The parts of the clutch controlling means are so adjusted that when the member $d$ is released the unwinding of the spring S will effect a rapid partial rotation of the member $d$, about one quarter of a revolution, relatively to the shaft C, to thereby move the said member to the left, viewing Fig. 8, by its engagement with the threaded sleeve $c$, such movement effecting operative engagement of the fast and loose clutch members to thereby rotate the main shaft. When the machine is running and the member $d$ is stopped, as will be described, the momentum of the other moving parts of the machine will operate to turn the shaft until the spring is wound up, and at the same time the clutch is released by movement of said member $d$ to the right, Fig. 8, the brake mechanism operating simultaneously to stop the machine with the horn or work support lowered.

The member $d$ is provided with an external segmental flange $d^4$, and at its leading end, (rotation of the shaft C being in the direction of arrow 12, Fig. 9,) I prefer to secure a hardened steel block $d^5$, forming a stop to coöperate at times with a detent $a$, preferably also made of hardened steel and attached to the upper end of an arm $a^x$ of a bell crank lever, said detent when in position shown in Figs. 2, 7 and 9 engaging the stop $d^5$ and preventing rotation of the two members of the clutch controller. In order to provide an additional safeguard to prevent stoppage of the machine at any other position than with the horn lowered, the flange $d^4$ is made segmental, forming a continuation of the block $d^5$, so that the detent $a$ cannot move into operative position to stop the apparatus until the rear or trailing end $d^6$ of the segmental stop passes beyond it, so that the horn cannot be lowered finally without stopping the machine, and the machine cannot be stopped without lowering the horn.

From the foregoing it will be obvious that the change in the relative angular positions of the two members $d$ and $e$ of the clutch controller is made effective to throw the clutch into or out of operation as the case may be, and the movable clutch member $C^2$ is positively moved into or out of engagement with the coöperating fast member $C'$ without the use of a spring or springs interposed between or to pull said members apart.

It is at times desirable to turn the machine over by hand, and in order to do this without slipping the driving belt from the pulley $C^2$, I have provided a locking device for the clutch controller, shown best in Figs. 7, 9 and 10 and consisting of a dog $d^8$ on the end of a rocking stud $d^9$ mounted parallel to the main shaft in a bearing $d^{10}$ of the member $d$, which latter has a peripheral recess $d^{12}$ therein to receive the dog when in operative position, Fig. 10 and dotted lines Fig. 7, or in inoperative position Fig. 2 and full lines Fig. 7. The inner side of the stud $d^9$ is flattened at $d^{13}$, see Fig. 9, to be acted upon by a plunger $d^{14}$ operated by a spring $s^6$, said plunger and spring moving in a suitable socket in the member $d$, the tendency of the spring being to throw the dog $d^8$ in toward a recess $e^8$ see Fig. 7, in the periphery of the member $e$ of the clutch controller, it being remembered that the recess $d^{12}$ exposes the periphery of said member $e$. When it is desired to lock the members $d$ and $e$ the dog $d^8$ is turned into dotted line position Fig. 7, and the detent $a$ withdrawn, permitting the member $d$ to rotate until the dog $d^8$ snaps into the recess $e^8$, which will take place before the clutch is thrown into operation.

The hub $a'$ of the arm $a^x$ has extended loosely through it the sleeve-like hub $g$ of a lever arm G, Fig. 4, mounted to rock on a fixed stud $G^x$ extended from a boss $A^3$ of the head $A'$, the lever arm G carrying a roll or other stud $g^x$, Fig. 3, to travel on an edge cam $C^4$ secured to or forming part of the fast member $C'$ of the clutch, a washer $w^3$ retaining the hubs $a'$ and $g$ on the stud $G^x$. The cam $C^4$ has a low portion gradually curving in from about the point 25 to the point 30, where there is a quick rise to the circular portion of the cam, which latter continues to the point 32, between which and the point 25 the low part of the cam will permit the lever arm G to swing inward sufficiently to release the clutch, the brake being set gradually after the roll $g^x$ passes the point 25. The arms $a^x$ and G are connected by a pin or stud 13, Figs. 2 and 3, to rock in unison, so that the cam $C^4$ may govern the movement of the detent $a$ and thereby the operation of the clutch controller and clutch.

As shown in Fig. 6 the periphery of the clutch member $C'$ is beveled or substantially $\Lambda$-shaped, to be engaged by an interiorly grooved two-part brake shoe $b$, $b'$, connected by a suitable bolt $b^2$, a link $g'$ adjustably connecting the part $b$ with the part or arm $g^2$ of lever G, while the free end of the part $b'$ of the shoe embraces an eccentric sleeve $b^3$ shown separately in Figs. 5$^a$ and 5$^b$, longitudinally split and clamped by a suitable bolt $b^4$ on the hub $g$ of the lever arm G. When the clutch is inoperative, the parts then being in the position shown in Fig. 2. the separated ends of the brake shoe will be drawn together to tightly clamp the periphery of the fast clutch member C', the roll $g^x$ resting on the lowest part of cam $C^4$.

A spring $S^x$, Fig. 1, surrounding the link $C^7$ and bearing on a collar 14 thereon, is held at its other end by a bearing $A^4$, the spring normally depressing the rod or link $C^7$ which is connected at its upper end to the arm $a^2$ of lever arm $a^x$, to apply the brake, as in United States Letters Patent Nos. 762,802 and 786,190, herein referred to, the rod $C^7$ being controlled by a foot treadle, not herein shown, which operates to lift the rod when the operator desires to start the machine. When said starting rod is lifted, the arm $a^x$ is rocked to the left, Fig. 2, withdrawing the detent $a$ from the end of the segmental stop $d^4$, permitting the clutch controller to throw the clutch into operation, as described, and at the same time lever arm G is rocked so that the link $g'$ moves the part $b$ of the shoe out from the periphery of the clutch member C' while the eccentric $b^3$ operates to throw out the other part $b'$ of the shoe. The brake mechanism is thus released as the clutch becomes operative, and vice versa, the main portion of cam $C^4$ holding the brake inoperative as the roll $g^x$ travels thereover.

A cam groove $C^5$ is formed in the inner face of the cam disk $C^4$, see Fig. 3, in which enters a roller or other stud $c^{12}$ on a lever $c^{13}$ fulcrumed on a stud $c^{14}$ in the head, the cam groove being circular between the points 17 and 18, approaching and then receding from the center between 18 and 19, and thence having a quick drop to 20, from which there is a gradual rise to 17. To the outer end of the lever $c^{13}$ is pivoted the upper end of a link $c^{15}$ connected with and to control the horn, the intervening connections being substantially as shown in U. S. Patent 403,835. Between the points 19 and 17 the groove $C^5$ is enlarged to permit the roll $c^{12}$ to at times bear against the circular outer wall of the said groove $C^5$, so that the horn lifting spring may, if free to act, then raise the horn and clamp the stock. The inner end of the lever $c^{13}$ is provided preferably with a hardened steel block to form a shoulder $c^{16}$, at times engaged by a pawl $c^{17}$ pivotally mounted in a pawl-carrier $c^{18}$ having a hub $c^{19}$ fulcrumed on the stud $c^{14}$, the pawl-carrier being provided with a roll $c^{20}$ to be acted upon by a quick motion cam $C^6$ on the inner face of the cam disk $C^4$. A spring $s^3$ held in a housing $c^{21}$ on the pawl-carrier rests at its lower end against a fixed part of the head $A'$ and maintains the roll $c^{20}$ in engagement with the cam $C^6$. The pawl is governed by a pawl controller $c^{22}$, see Figs. 3 and $3^a$, shown as an arm pivoted to the lever G and having a notch 50 on its upper side near its outer end and a lug $c^{23}$ beveled at 51 on its face adjacent the notch, to coöperate with a tooth $c^{24}$ on the side of the pawl $c^{17}$, a spring $s^5$ pressing the controller toward said tooth. When the machine is started, by raising the rod $C^7$ the lever arm G is swung to the right, Fig. 3, so that the pawl tooth $c^{24}$ enters the notch 50 of the controller, disengaging the pawl from the shoulder $c^{16}$ and holding it disengaged while the pawl carrier rocks to the left, the outer end of the lever $c^{13}$ being thus left free to be depressed while the horn spring raises the horn and clamps the work. The part 20 to 19 of the cam groove $C^5$ serves to guide the roll $c^{12}$ into the narrower portion of the groove, and between the points 19 and 18 the outer end of the lever $c^{13}$ is lifted to depress the horn sufficiently for feeding of the work over the horn, while the work is clamped to the horn as the roll $c^{12}$ travels over the circular part of the groove from 18 to 17. As long as the lever arm G is held out to the right, Fig. 3, the horn will be automatically raised and lowered at each revolution of the shaft C, and the pawl $c^{17}$ will be maintained inoperative, but if the said lever arm is released after starting the machine, the clutch will be released when the roll $g^x$ leaves the high part of cam $C^4$ and engages the low part 32—25, after which the brake is applied when the roll reaches the part 25—30, and the pawl $c^{17}$ will be moved by the controller $c^{22}$ into position to engage the shoulder $c^{16}$ of the lever $c^{13}$. As the cam $C^6$ depresses the pawl-carrier $c^{18}$, the then operative pawl will act to elevate the outer end of the lever $c^{13}$ and thereby positively depress the horn as the machine comes to a full stop, so that the machine is always in readiness to receive work, or to permit its removal before or after nailing respectively.

Figures 12, 15, 25:
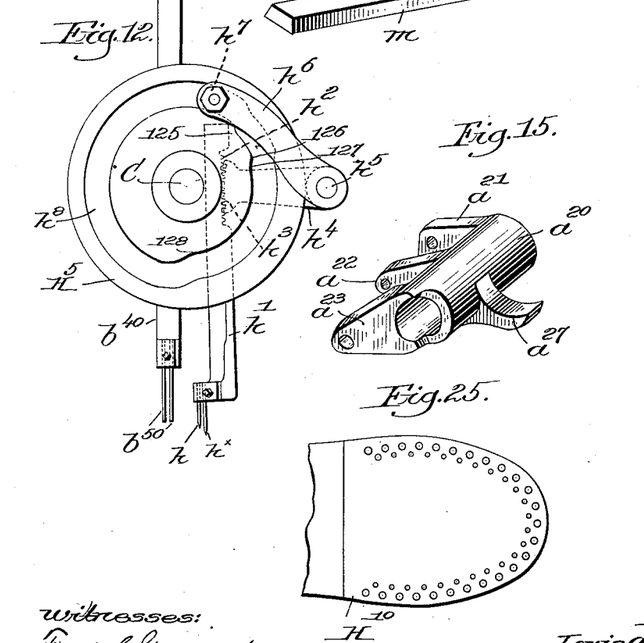
Fig. 12 is a partial front elevation of the head of the machine shown in Fig. 1, to more clearly illustrate the double awls and drivers, with the awl controlling cam.
Fig. 15 is a perspective detail, enlarged, of a part of the said wire feeding mechanism.
Fig. 25 is a plan view of a heel showing two rows of nails or fastenings, driven or inserted into the work in pairs by the machine herein shown.
Figures 13, 13A, 14:
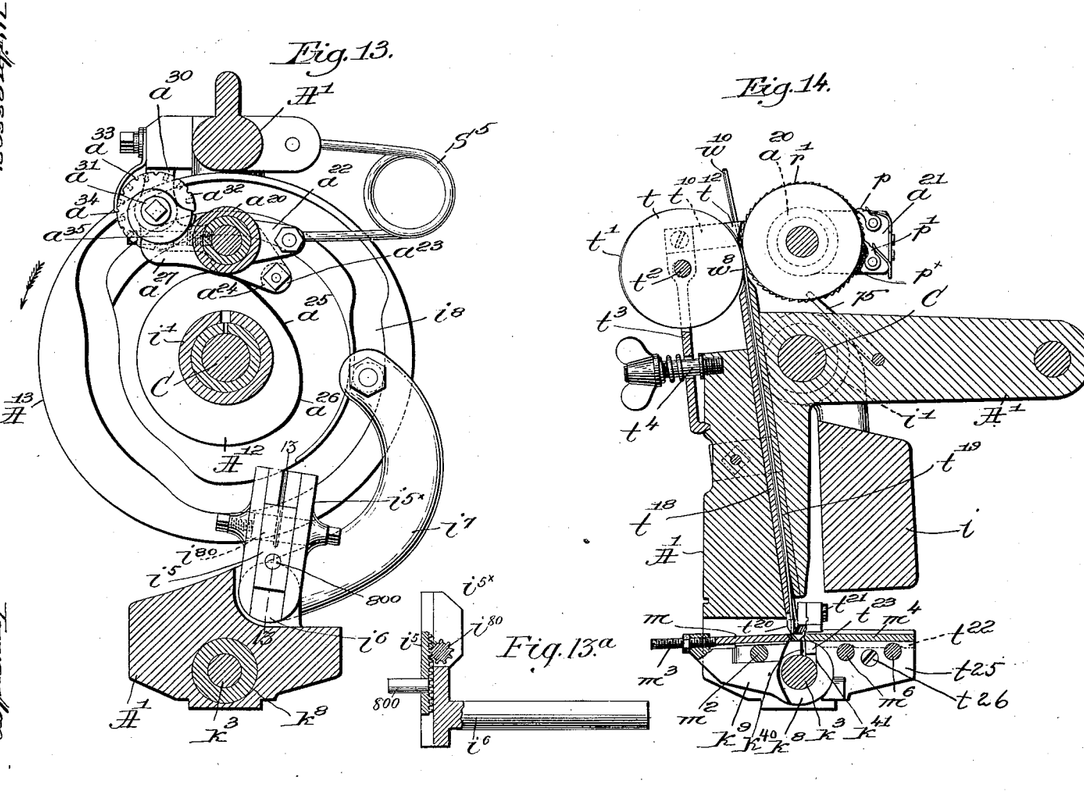

The wire feeding mechanism is shown in Figs. 1, 13, 14 and 15, and consists of a pawl carrying sleeve $a^{20}$ having an arm $a^{21}$ provided with spring pawls $p$, $p'$, offset laterally one from the other, which act on two ratchet wheels $r$, $r'$, respectively, connected with roughened or serrated feed wheels $r^{10}$, $r^{12}$, adapted to engage and feed the two strips of wire-like material $w^8$, $w^{10}$, Fig. 14, which strips are pressed against the feed wheels by presser wheels or rolls $t$, $t'$.

Referring to Figs. 14, 16, and 17, the presser wheels are rotatably mounted on a shaft $t^2$ carried by a yoke $t^3$ adjustably attached to the head of the machine by a screw $t^4$, the wheel $t$ rotating on the main portion thereof while the wheel $t'$ is mounted on an eccentric portion $t^x$, whereby by turning the shaft, the wheel $t'$ may be moved toward or from its coöperating feed wheel, to accommodate wire of different diameters. By this arrangement a large and a small wire may be used, or two wires of the same size, a set screw $t^5$ holding the shaft $t^2$ in adjusted position.

If it is desired to stop feeding of the wire for any purpose, without stopping the entire machine, a feed stop, shown as an arm 75 pivotally mounted on the head A', Fig. 14, is turned up beneath the arm $a^{21}$, preventing its descent to enable the pawls to engage new portions of the ratchet wheels.

It is sometimes desired to feed one wire to a greater extent than the other, or to altogether prevent feed of one of the wires, and to provide for this I have mounted on the head an adjustable shield $p^x$, concentric with the ratchet $r'$ and shown as adapted to coöperate with the pawl $p'$. By moving the shield part way up, the active length of the stroke of the pawl is decreased and the rotative movement of the feed wheel $r^{12}$ is correspondingly decreased, and by moving it up all the way, the pawl is prevented from engaging the ratchet wheel $r'$ at all, so that feed of the wire-like strip $w^{16}$ will be stopped altogether.

A second arm $a^{22}$ on the sleeve $a^{20}$ has connected therewith a strong spring $S^5$, the other end of the spring being secured to a part of the head A', the spring serving to keep a roll $a^{24}$ on a third arm $a^{23}$ of the sleeve pressed toward a cam $A^{12}$ on a disk $A^{13}$, a flattened portion $a^{25}$ of the cam permitting the roll to move freely more or less when the pawl carrier is moving on its back stroke to assume a starting point, the roll moving a distance in accordance with the adjustment of a measuring device, to be described, before the rise $a^{26}$ engages and lifts the roll to effect the feed, the cam $A^{12}$ effecting the feed stroke of the pawl carrier. When the strip or strips $w^8$, $w^{10}$, are fed forward more or less by such movement, the cutters, to be described, are actuated to cut or sever a portion of the strip or strips to form the fastening or fastenings to be driven.

A bracket $a^{30}$ on the head, see Fig. 13, supports a short rotatable shaft $a^{31}$ on which is secured a disk $a^{32}$ having notches $a^{33}$ to be entered by a catch or detent $a^{34}$, while a cam $a^{35}$ also fast on the short shaft is adapted to engage a concaved arm or stop $a^{27}$ on the sleeve $a^{20}$. By turning the disk $a^{32}$ more or less, the cam $a^{35}$ will act on the stop $a^{27}$ to depress it more or less and thereby elevate the roll $a^{24}$ correspondingly, so that the length of the up stroke of the pawl carrier will be decreased or increased, the greater the depression of the stop $a^{27}$ the shorter the stroke of the pawls, and the feed will be correspondingly reduced.

The yoke $t^3$ has rigidly secured to its upper end a guide, shown as a bar $t^{10}$ provided with a laterally offset head $t^{12}$ which is extended between the feed rolls, as shown in Figs. 14 and 16, above the points of engagement with the wire-like material $w^8$, $w^{10}$, the faces $t^{13}$, $t^{14}$, Fig. 18, being concaved and converging downward, in order to admit the head into the space between the rolls. Parallel guide grooves $t^{15}$ are formed in the front of the head $t^{12}$, through which the wires or strips $w^8$, $w^{10}$, pass on their way to the rolls, and thence down the long guide, shown as two plates $t^{18}$, $t^{19}$, Fig. 14, the former having guideways or channels shaped to correspond substantially to the cross-section of the fastening material.

The cutters which are actuated to cut or sever a portion of the strip-like material to form the nail or fastening to be driven are beveled at their edges, and the said edges are brought together in the said material. If the strip-like material is held rigidly at the severing point, the strain upon the cutters and also upon the material is improperly increased, and to obviate such strain the material passes from the lower end of the long fixed guide $t^{18}$, $t^{19}$, to a movable guide interposed between said fixed guide and the throat or nail carrier.

Figures 21, 22, 23, 24:
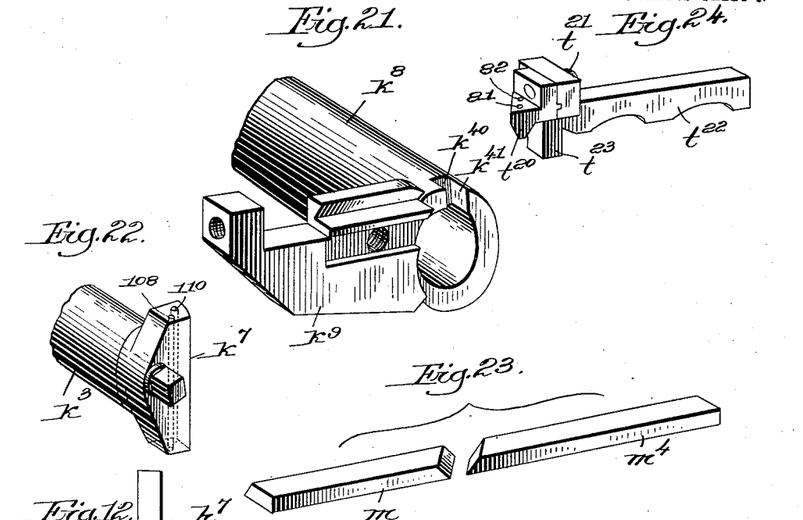
Fig. 21 is a perspective view of a portion of the knife-carrier.
Fig. 22 is a similar view of the throat or nail carrier, the shank of which is supported in the hollow body of the knife-carrier.
Fig. 23 shows in perspective the fixed and movable cutting blades or knives, detached.
Fig. 24 is a perspective view of the movable guide for directing the wire or wire-like material to the nail-carrier.

Referring to Figs. 19 and 21, a hollow sleeve $k^8$ is mounted to rock in a suitable bearing in the head A', said sleeve at its outer end having a laterally extended arm $k^9$, and an eccentric slot $k^{40}$ in its upper wall at one side of its longitudinal axis.

The movable guide is shown as a block $t^{20}$, Fig. 24, adjustably held by a set screw $t^{21}$ passing through an elongated slot in the upturned head of a bar $t^{22}$, provided below the head with a depending foot $t^{23}$ which is adapted to enter loosely the eccentric slot $k^{40}$ in the sleeve $k^8$, as shown in Fig. 14, the guide $t^{20}$ having, as herein shown, two holes 81, 82, for the reception of the strips $w^8$, $w^{10}$, as they pass to the cutters. The bar $t^{22}$ is slidably mounted in a guideway formed partly in the head of the machine and partly in a clamping plate $t^{25}$, see Fig. 1, detachably secured to the head by the screw $t^{26}$, as shown in Fig. 14.

The movable cutting blade $m$, is held in adjusted position on the arm $k^9$ by a cap plate $m'$ see Fig. 19, which is secured to the arm $k^9$ by the screw $m^2$, a longitudinally movable screw $m^3$ bearing against the outer end of the cutter to move the cutter inward as desired, see Fig. 14.

The stationary cutter $m^4$ is held between the clamping plate $t^{25}$ and a detachable cap $m^5$ by set screws $m^6$, see Fig. 1, the beveled edges of the cutters being inclined relatively to the longitudinal axis of the sleeve $k^8$, in the present instance, in order to act upon the strips $w^8$, $w^{10}$, as they pass from the guide $t^{20}$. When the said strips have been fed into the throat $k^7$, to be referred to, the sleeve $k^8$ is rocked, causing the movable cutter to approach the fixed cutter, to cut off the fastenings, and as the sleeve rocks to the right, Fig. 14, the movable guide $t^{20}$, by means of the part $t^{23}$ engaging the eccentric slot $k^{40}$ in the sleeve, is moved in the same direction, so that the wire-like material can move with the movable cutter, eliminating undue strain on the cutter and the material. As the sleeve $k^8$ is returned to normal position after the severing operation the wall $k^{41}$ of the slot $k^{40}$ acts upon the foot $t^{23}$ and positively returns the guide to position during the next feeding movement.

Referring now to Fig. 1, a peripherally grooved cam $k$ on the shaft C actuates a roller or other stud on a lever $k'$ pivoted at $k^{90}$, said lever at its lower end having rack teeth, see Fig. 19, to engage a toothed block $k^2$ having extended through it a shaft $k^3$, a nut $k^{95}$ holding the block securely on the shaft, said shaft being supported in the sleeve $k^8$ before referred to, the block $k^2$ sliding in a suitable bearing in the head A'. The forward end of the shaft $k^3$ has attached to it a suitable throat $k^7$, provided with two parallel passages or holes 108, 110, into which the wire or strip-like material is fed from the movable guide $t^{20}$, and after the fastenings or nails have been severed, as described, the throat is moved with the fastenings into the path of the drivers $b^{50}$, the lever $k'$ effecting such longitudinal movement of the throat. To move the throat out of alinement with the inclined wire passage into a vertical position it is necessary to tip the throat slightly, and this is accomplished in the following manner: The shaft $k^3$ and sleeve $k^8$ are connected together by the spline $k^{10}$, and the sleeve $k^8$ has attached to it a lever $k^{13}$ provided with a roller to enter a cam groove in the rear face of the disk $A^{13}$. The lever and disk are shown in Fig. 1, but the engagement of the roller with the cam groove in the disk is hidden by the main shaft. The rotation of the disk $A^{13}$ moves the lever $k^{13}$ to rock the sleeve $k^8$ for cutting the wire, and this rocking movement of the sleeve carries the throat into a vertical position, after which it is moved forward by the lever $k'$ into the path of the driver.

The driver bar $b^{40}$ has attached to it two drivers $b^{50}$, as shown in Fig. 12, and I have provided two awls $h$, $h^x$, attached to a reciprocating awl bar $h'$ provided with a rack $h^2$ to be engaged by a segment gear $h^3$ on one arm $h^4$ of a bent lever fulcrumed at $h^5$, the other arm $h^6$ having a roller or other stud $h^7$ which enters a groove $h^8$ in the outer face of a cam hub $H^5$ fast on the main shaft C. The awl bar shank slides vertically in a rocking frame $i$ having a sleeve-like hub $i'$ embracing a hub surrounding the main shaft, the stock being fed while one of the awls is in it by means of suitable devices forming no part of this invention.

As the fastenings are driven the work must be turned, as when inserting fastenings in the heel $H^{10}$, Fig. 25, and when two awls are used it will be obvious that both cannot be in the work when it is being turned. Accordingly I have made the awl $h^x$ longer than its fellow $h$ in the present embodiment of my invention, and it is inserted into the work far enough to permit feed of the latter and any necessary turning of the same, after which the other awl $h$ enters the work and makes the hole for its fastening, each awl thus making its own hole for the insertion therein of a fastening. This movement is effected by the shape of the cam groove $h^8$, the part from 125 to 126 causing insertion of awl $h^x$ into the work for feeding, and the work can be turned by the operator at such time, while the part of the groove from 127 to 128 causes the insertion of both awls, $h$ and $h^x$, to properly pierce the work for the subsequent insertion of the fastenings when the awls are withdrawn from the work.

The feeding device forms no part of this present invention, but comprises a guideway formed on the rear side of the rocking frame $i$, one wall $i^3$ of the guideway being detachably secured to the rocking frame, so that it may be adjusted to take up wear. Mounted in this guideway is a swivel block, not shown, which is provided with an opening to receive a pin 800 extended from a dove-tailed slide $i^5$ fitted in a passage in a split rocking arm $i^{5x}$, see Fig. 13. The arm $i^{5x}$ is secured to a short rock shaft $i^6$ having an arm $i^7$ provided with a roller which enters a cam groove $i^8$ in the outer face of the disk $A^{13}$. As the rocking frame $i$ and the rock arm $i^7$ are connected together by means of the swivel block and the pin extending from the slide $i^5$ it will be seen that any movement of the rock arm $i^7$ is imparted to the rocking frame $i$, thereby effecting the feed of the stock which is penetrated by the awl attached to the awl bar mounted in the rocking frame $i$. A stud gear $i^{80}$ mounted in the arm $i^{5x}$ engages teeth formed on the rear face of the slide $i^5$, whereby said slide may be moved up or down relatively to said arm and rocking frame when it is desired to change the length of feed.

While I have herein shown and described in detail novel clutch mechanism and controlling means therefor, the same is not herein broadly claimed, inasmuch as said clutch mechanism and controlling means therefor form the subject-matter of United States Letters Patent No. 762,802, granted June 14, 1904, wherein such clutch mechanism and controlling means are broadly claimed.

Any suitable edge gage may be used in this machine, preferably though, I use such an edge gage as that shown and described in my pending application Serial No. 562,498, filed May 20, 1910, Having described my invention what I claim as new and desire to secure by Letters Patent is:—

1. In an apparatus of the class described, a vertically movable work-support or horn, a driving shaft, a cam thereon, connections between said cam and work-support and operated by the former, to positively effect downward movement of the horn, manually controlled means to start the apparatus, including a clutch and controlling devices therefor, an elongated, segmental stop forming a part of such controlling devices and rotatable with the main shaft, and a detent to stop the apparatus and adapted to be held in inoperative position by the periphery of said stop, to prevent stoppage of the apparatus before the horn is lowered.

2. In an apparatus of the class described, a rising and falling horn, a driving shaft, means, including a cam thereupon, to effect downward movement of the horn, a clutch for the driving shaft, controlling means for the clutch, including two members mounted on the shaft and having a limited relative angular movement, a segmental stop on one of said members, and a manually controlled detent to maintain the clutch inoperative when engaged by the leading end of the stop, the periphery of the latter preventing return of the detent into stopping position before the lowering of the horn.

3. In an apparatus for inserting fastenings, two feed wheels, means to rotate them intermittingly, two opposed and coöperating presser wheels, a common supporting shaft for the presser wheels, having an eccentric portion on which one of them is mounted, whereby rotation of the shaft will vary the distance between one of the feed wheels and its corresponding presser wheel, and means to maintain the shaft in adjusted position.

4. In an apparatus for inserting fastenings, two feed wheels placed side by side, means to rotate them intermittingly, two coöperating presser wheels mounted eccentrically to each other on a common support, and means to vary the distance between one of the presser wheels and its corresponding feed wheel.

5. In an apparatus for inserting fastenings, two feed wheels placed side by side, and rotatable on a fixed support, means to rotate them intermittingly, an adjustable yoke, a shaft mounted thereon and having an eccentric portion, two presser wheels mounted on the main and eccentric portions of the shaft respectively, whereby rotation of the latter will vary the distance between the eccentrically mounted presser wheel and its corresponding feed wheel, and means to maintain the shaft in adjusted position.

6. In an apparatus of the class described, two feed wheels, means to rotate them intermittingly, two coöperating presser wheels, a guide having an offset, grooved head provided with concave, downwardly converging sides and extended between the said presser and feed wheels, to feed strips of wire-like material to said wheels, and cutters to sever said strips of material into lengths to be driven.

7. In an apparatus of the class described, wire-feeding devices, an elongated, fixed guide below them, a fixed and a movable cutter, to sever the wire, a bodily movable guide for the wire located adjacent the cutters, and a sliding support on which the movable guide is mounted, said guide moving with the wire when the latter is engaged by the cutters, to relieve the strain upon the latter.

8. In an apparatus of the class described, wire-feeding devices, an elongated, fixed guide below them, a fixed and a movable cutter, to sever the wire, a bodily movable guide for the wire adjacent the cutters, its support and means to engage said support and positively return the guide to normal position after its lateral movement effected by severance of the wire by the cutters.

9. In an apparatus of the class described, wire feeding devices, an elongated, fixed guide below them, a fixed and a movable cutter, to sever the wire, an oscillating carrier for the movable cutter provided with an eccentric slot, a throat below the cutters, a movable guide for the wire, interposed between the fixed guide and the throat, and a foot depending from the movable guide and loosely entering the slot of the oscillating cutter carrier, to positively return the former to a fixed, normal position after severance of the wire.

10. In a nailing machine, a reciprocating driver bar, two drivers carried thereby, a reciprocating awl bar having two awls of unequal length, and means to depress the awl bar to insert the longer awl in the work, and thereafter to further depress said bar to insert the shorter awl in the work.

11. In a nailing apparatus, a reciprocating driver bar, two drivers carried thereby, an awl bar, two awls of unequal length mounted upon it, and means to depress the awl bar intermittingly, to first insert the longer awl into the work during which time the work may be turned about said awl as a center, and thereafter to effect the entrance of the shorter awl into the work.

12. In a machine of the class described, two awls of unequal length, and means to cause the longer awl to enter the work, and to cause the shorter awl thereafter to enter the work, whereby the work may be turned after the longer awl has entered it and before the shorter awl is caused to enter the work.

13. In a machine of the class described, two awls of unequal length, and means to cause the longer awl to enter the work, and to insert the shorter awl into the work after feed thereof, and means to cause said longer awl to feed the work.

14. In a machine of the class described, two awls, means to insert them successively into the work to different depths, and means to effect a feed of the work after the latter has been entered by the first awl and prior to the entrance of the second.

15. In a machine of the class described, two awls of different length, a common awl bar therefor, means to effect successive engagement of said awls with the work, and means to move the awl bar bodily to effect feed of the work before the shorter awl engages the same.

16. In a machine of the class described, two awls, and a single mechanism for operating them, said parts being constructed and arranged to cause one awl to enter the work in advance of the other.

17. In a machine of the class described, two awls, a single mechanism for operating said awls, said parts being constructed and arranged to cause one awl to enter the stock in advance of the other, and means to cause the awl first entering the stock to feed the same.

In testimony whereof, I have signed my name to this specification, in the presence of two subscribing witnesses.

LOUIS A. CASGRAIN.

Witnesses:
GEO. W. GREGORY,
JOHN C. EDWARDS.

---

Copies of this patent may be obtained for five cents each, by addressing the "Commissioner of Patents, Washington, D. C."